United States Patent [19]

Courtright

[11] 4,192,340

[45] Mar. 11, 1980

[54] AGRICULTURAL IRRIGATION SYSTEM AND COMPONENTS THEREFOR

[75] Inventor: Burr Courtright, La Grande, Oreg.

[73] Assignee: CH₂O, Inc., La Grande, Oreg.

[21] Appl. No.: 973,893

[22] Filed: Dec. 28, 1978

Related U.S. Application Data

[62] Division of Ser. No. 738,044, Nov. 2, 1976, Pat. No. 4,151,858.

[51] Int. Cl.² .............................................. B05B 3/18
[52] U.S. Cl. .................................. 137/344; 180/14 R; 239/184; 239/212
[58] Field of Search ...................... 137/344; 180/14 R; 239/184, 212, 213

[56] References Cited

U.S. PATENT DOCUMENTS

| | | | |
|---|---|---|---|
| 3,680,787 | 8/1972 | Sherman | 239/212 X |
| 3,848,625 | 11/1974 | Courtright | 137/344 |
| 4,016,902 | 4/1977 | Vollmer | 239/212 X |

*Primary Examiner*—Gerald A. Michalsky
*Attorney, Agent, or Firm*—M. Ralph Shaffer

[57] ABSTRACT

In an agricultural irrigation system comprising an elongate wheel line having an elongate, essentially rectilinear, central, water conveying conduit and a series of wheels keyed to and supporting such conduit; the inclusion in said irrigation system of a master or propulsion unit for advancing the line in a direction transverse to the orientation of the central conduit thereof and a series of torquing units or torque booster units mutually spaced along and coupled to said line for applying torque at a series of points remote from the master unit. Each unit may be provided with means for speeding up, slowing down, and stalling out such unit in accordance with requirements for changing the operating conditions of each unit in order to keep the wheel line essentially straight. The entire structure and components thereof serve as a composite, torque-sensing structure so as to be automatically operative to adjust the operation of the booster units and master unit, as needed, so as to compensate for torsion lag, line deflection, and undulating terrain, and so forth, which otherwise would distort the line. Torque resistance sensing is also made a feature of the invention to dramatically alter the fluid flow, for hydraulic operation of one or more of the respective units, so as to compensate for dramatic increases in torquing resistance.

14 Claims, 13 Drawing Figures

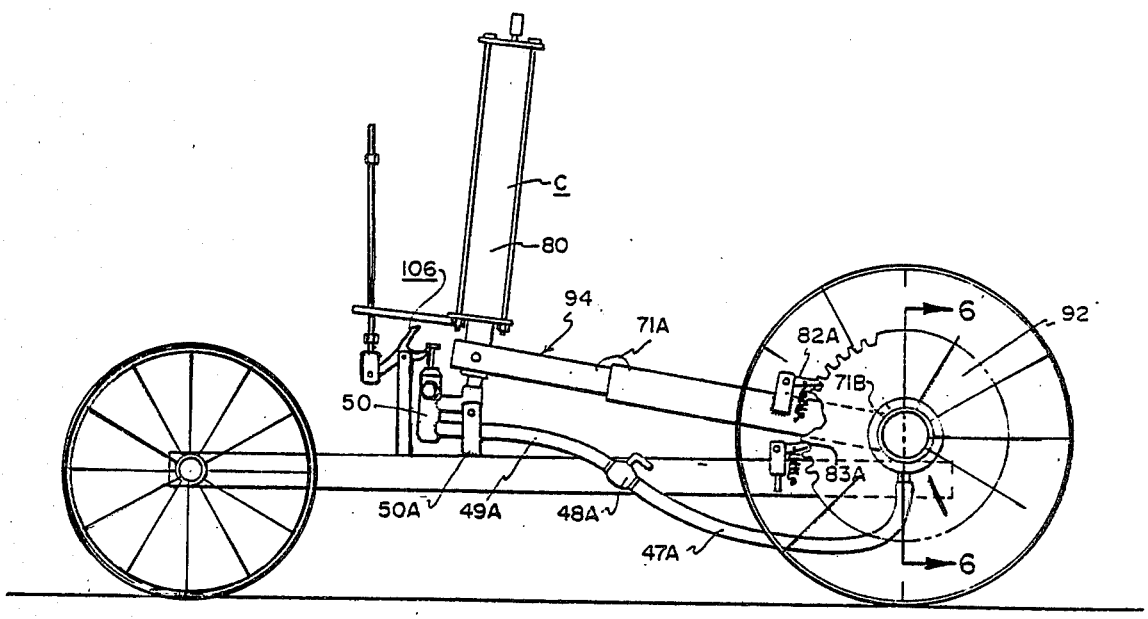
FIG 5
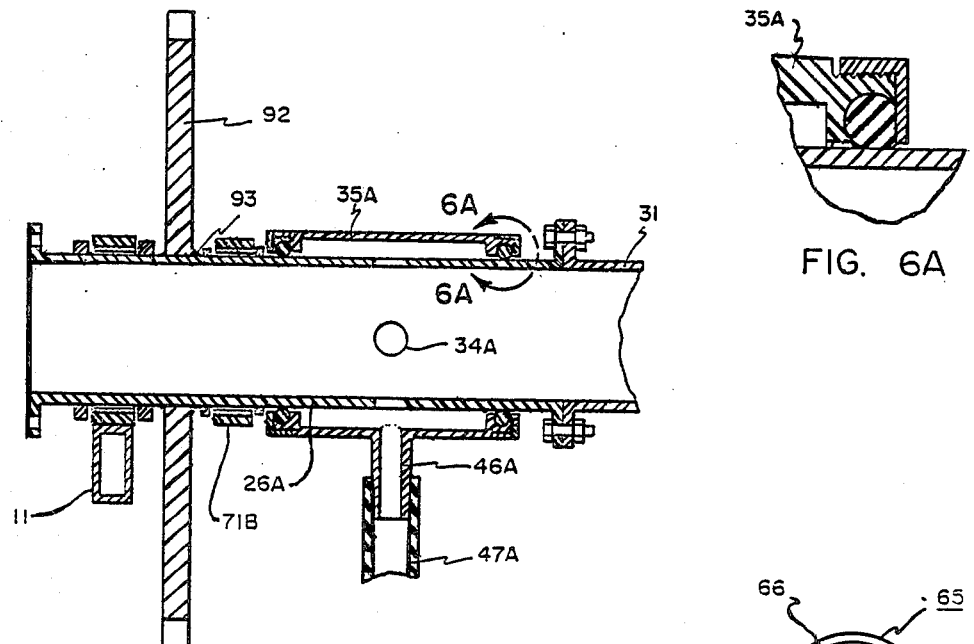
FIG. 6
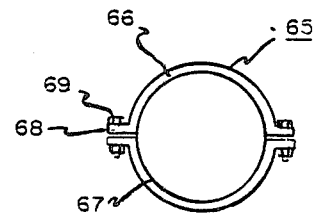
FIG. 6A
FIG. 6B

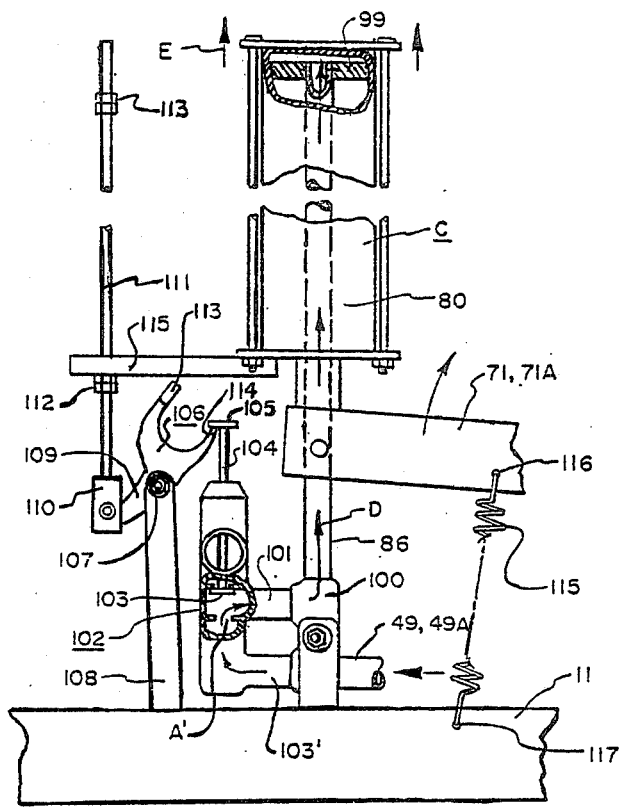
FIG. 7
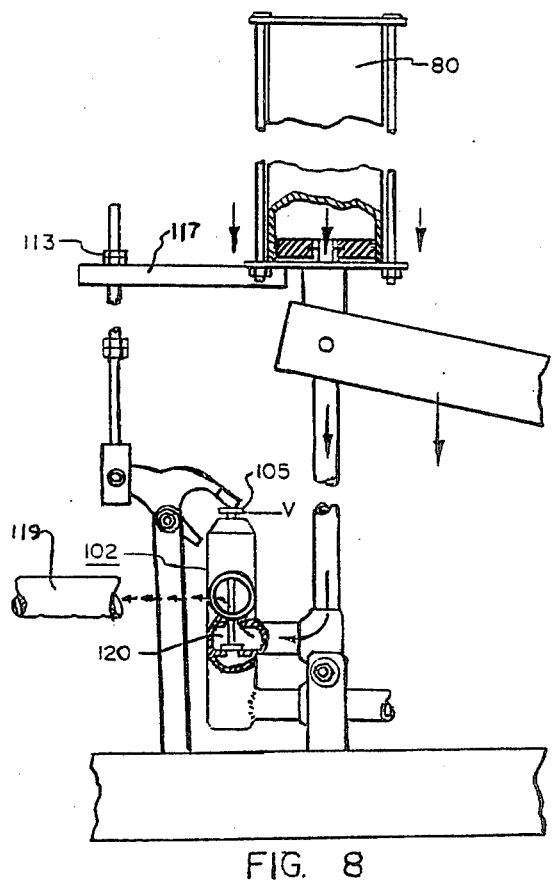
FIG. 8
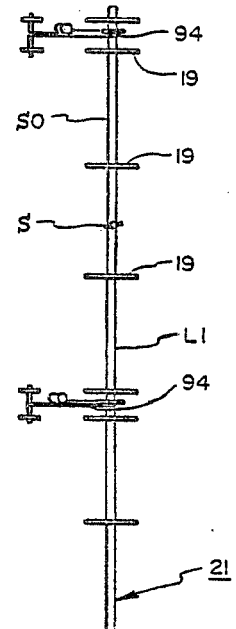
FIG. 9
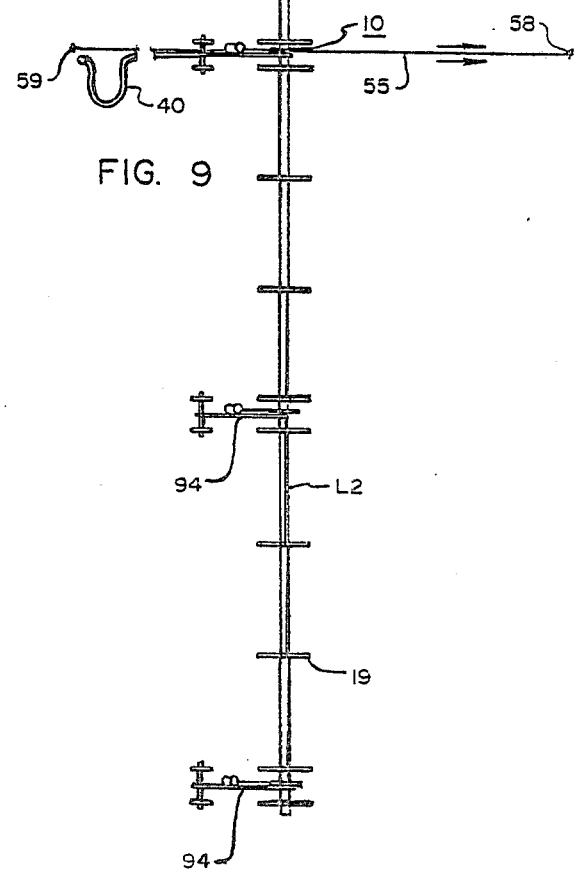

AGRICULTURAL IRRIGATION SYSTEM AND COMPONENTS THEREFOR

This is a division of application Ser. No. 738,044, filed Nov. 2, 1976, now U.S. Pat. No. 4,151,858.

FIELD OF INVENTION

The present invention relates to elongate wheel lines in agricultural irrigation systems and, more particularly, to translation and torque booster units, at mutually spaced points along such line, to aid in the translational advancement thereof, and also to provide automatic means for adjusting said line so as to correct for any substantial deflections that might appear in the line during the operation thereof.

DESCRIPTION OF PRIOR ART

Elongate wheel lines, commonly used as side-roll wheel lines, are common in the art and comprise an elongate central tubular conduit supported by wheels mutually spaced along and keyed to such line. The conduit carries mutually spaced sprinkler equipment so that water carried by such line can communicate with such sprinkler units and be sprayed onto the field over which the line is traversing.

Heretofore, a master unit intended to propel the line forwardly, i.e. along a direction transverse to the orientation of such line, has been used both to advance the line forwardly and also to supply torque thereto. Of course, the mere translation of the line forwardly will impart some torque to the wheels since the wheels are keyed to the line. Previously the inventor has devised a torque booster unit which can be attached or coupled to the line at a point remote from the master transport unit. Such device can be operative by the water pressure contained in the line to actuate a hydraulic jack for supplying a torque-boost or torque-assist to the line at a point remote from such booster unit. These torque boosters are mutually spaced along such line to supply additional torque to the wheel line so as to tend to keep the same straight.

Keeping an agricultural wheel line in an essentially rectilinear condition is extremely difficult. This is because of torsional lag in the central conduit of the line, taking into consideration the translational force imparted by the master unit relative to the line. Also, there is torsional lag and bowing that might be occasioned as a result of the structure of the line itself. Furthermore, ground undulations and contours require some of the wheels on the wheel line to be driven a greater number of revolutions than other wheels, i.e. those riding on flat-ground lengths, in order for the line to be kept straight.

BRIEF SUMMARY OF THE INVENTION

The present invention provides an agricultural irrigation wheel line having a line translational propulsion unit and also a series of torque assist or torque booster units usually spaced along such line and also spaced of course by the master or propulsion unit. All of the units are preferably hydraulically driven by water pressure in the irrigation line itself. The master unit will generally be provided a coupling, for the hose to be dragged over the field and coupled to a water-pressure source. Both the master and the booster units, again, are coupled to and driven by line pressure in the wheel line, supplying pressured water for spray equipment carried by the line, advancing the line and torquing the same. Within a preferred form of the invention, each of the units include a hydraulic jack which effects translation and principal line torquing, as the case may be. Controls are provided the units for regulating the stall-out condition of each unit, at which point the jack becomes inoperative to further apply torque to a line or to translate the line, as the case may be, in the event of a predetermined excessive torque resistance. Accordingly, the units speed up, slow down, or stall out, automatically in response to an undesired line condition, i.e. deflection or deviation from the essential rectilinear condition desired. Should the master unit, therefore, advance "ahead" of the rest of the line, the torque resistance or loading of such unit will advance to a point where such master unit will automatically slow down and perhaps even stall out, to wait for the other part or portions of the line to "catch up". The same likewise applies to the booster units coupled to mutually spaced points along the line. Accordingly, laggard units, since their reduction in torque loading or torque resistance, tend to advance forwardly and even to speed up so as to catch up with the rest of the line; leading units sense an increase in torque-load or torque resistance so as to slow down and perhaps even stop, so that other portions of the line may catch up. In this way, the line is kept straight automatically.

Provision is also made for sensing torque-extremes as in the case where the line advances from sod to a ploughed field, so that maximum increases in torque resistance will measurably alter the fluid flow in the unit so as to provide, e.g. additional torquing and/or translational power to the wheel line.

OBJECTS

Accordingly, a principal object of the present invention is to provide a new and improved agricultural wheel line.

A further object is to provide a wheel line having a series of units mutually spaced therealong designed to keep the line straight during operation.

An additional object is to provide booster and translation units along an agricultural wheel line which will tend to adjust automatically in response to field and line conditions, for automatically keeping the wheel line straight or nearly so.

A further object is to provide torque-assist units, and also a new translation unit for a wheel line, for automatically adjusting in operative condition for the particular line condition at that point at which the respective units are coupled to the line.

An additional object is to provide control means in torque-assist and master units of an agricultural wheel line, which control means variably set the stall-out condition of the unit so that the same will stop in response to excessive torque resistance, thereby nullifying its operation until adjacent portions of the line catch up with the orientation of this particular line portion.

A further object is to provide excessive-torque resistant sensing means for regulating control structure that governs the propulsion and/or torque applied to a particular unit coupled to a wheel line.

The features of the present invention which are believed to be novel are set forth with particularity in the appended claims. The present invention, both as to its organization and manner of operation, together with further objects and advantages thereof, may best be understood by reference to the following description,

BRIEF DESCRIPTION OF DRAWINGS

FIG. 5 is a side elevation of a torque-assist unit employed in the invention.

FIG. 6 is an enlarged vertical section taken along the line 6—6 in FIG. 5.

FIG. 6A is an enlarged detail taken along the arcuate line 6A—6A in FIG. 6.

FIG. 6B is an enlarged side elevation of a representative clamp or retainer employed at various points in the structure.

FIG. 7 is an enlarged fragmentary view, partially in section and broken away, of a representative hydraulic jack or cylinder construction employed with lever means for actuating the torquing gear or capstan employed in the invention; FIG. 7 is representative of the hydraulic jacking structures of the units of both FIGS. 1 and 5.

FIG. 8 is similar to FIG. 7 but illustrates a reverse hydraulic flow and reverse operation of the cylinder construction.

FIG. 9 is a plan view of a wheel line incorporating the master or propulsion unit in a series of torque booster units along such line and in a manner so as to keep the line straight.

BRIEF DESCRIPTION OF PREFERRED EMBODIMENTS

Figure 1:
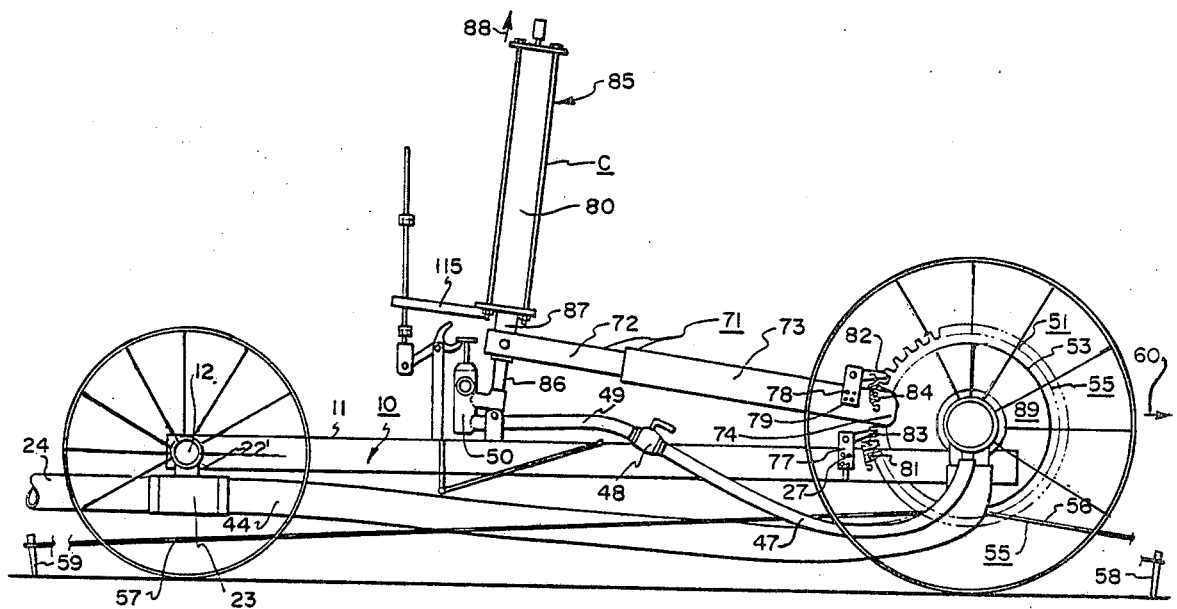
FIG. 1 is a side elevation of a master unit employed in the present invention.

In FIGS. 1-4, drive structure 10 is shown to include a frame 11 provided with fixed axle 12. Mounted upon axle 12 are rotatable wheels 13 and 14 which are maintained in place on the axle by clamps 15-18. Thus, the wheels 13 and 14 are free to revolve about the axle 12. FIG. 1 illustrates a master unit.

It will be understood that solely one wheel as at 13 can be used if desired; in any event, and to avoid excessive multiple tracks, it is desirous that the wheel 13 be in line with the wheel-line wheel 19 mounted upon central conduit 20 on the side-roll wheel line 21.

Frame 11 includes a downwardly oriented fin-bracket 22' provided with a hose coupler 23 to which the water supply hose 24 is connected. It will be understood that the water supply hose will be elongate, connected to a pump or water pressure source, and to be constructed for simply dragging over the field as the drive structure advances, longitudinally.

Frame 11 includes an annular hub 22 welded thereto at 23' and 24' and is provided with an inner bushing 25 receiving transverse conduit section 26. The conduit section 26 is provided with opposite bolting flanges 27 and 28 for bolting to the corresponding flanges 29 and 30 of the wheel line comprising sections 31 and 32. Attachments may be made by bolts 33.

Conduit section 26 has a series of wall slots 34 and is provided with a slide coupling tee 35. The latter may take any one of several forms and, in the embodiment shown in FIG. 4 for example, is provided with a tee body 36 having end flanges 37 and 38 which are threaded on the former. The tee portion 36 includes annular interior grooves 39 and 40 for accommodating O-ring seals or packing 41 and 42. It will be noted that the tee accommodates the conduit section 26 whether the same be rotating or fixed against rotation.

Tee member 35 includes a base connection 43 for fixably receiving and fastening to conduit 44 leading from hose coupling 23. See FIGS. 1 and 4.

The attachment of the conduit 44 to the leg or base 43 of the tee may be performed in any one of several ways such as clamping at 45 or by other means.

The tee 35 includes a pressure stub or port 46 as provided with conduit 47 that routes to pressure regulator valve 48. Conduit 49 connects between the pressure regulator valve 48 and multi-direction flow valve 50 as hereinafter described.

Capstan 51 includes an annular capstan portion 52 and also a ratchet wheel 53 welded or otherwise secured thereto. The capstan portion 52 is provided with an annular indented surface 54 which is depth-dimensioned and contoured to avoid "catspaw" of the wound cable 55. The cable 55 itself is wrapped partly a few times about the capstan portion 52 and then proceeds via its opposite extremities 56 and 57 to positioning stakes 58 and 59. Cable 55 is kept taut by spring or other means and serves both as a guide and also a drive means with the capstan for propelling the drive structure 10 in the direction of arrow 60 in FIG. 1.

Returning to FIG. 3, it is seen that clamping means 62, 63, and 64 may be provided, all of which are constructed similarly to representative clamp 65 in FIG. 6B. Thus, the individual clamps will comprise clamp halves 66, 67, provided with outwardly extending ears 68, accommodating nut and bolt attachments 69. Thus, all of the clamps 62-64 in FIG. 3, which may be identical or similar to clamp 65 in FIG. 6B, serve to position the respective parts and members in FIG. 3, yet not precluding or interfering with the rotation of central conduit 26. A bronze bushing or other member at 70 can be employed to aid in the rotation of capstan 55.

Figure 3:
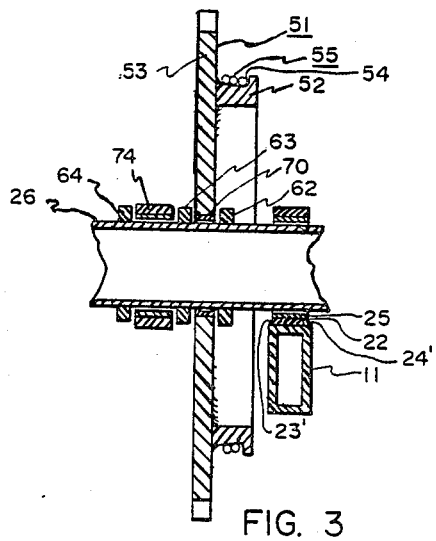
FIG. 3 is an enlarged vertical section taken along the line 3—3 in FIG. 2.

Lever 71 may be composed of telescoping lever member 72 and elongate lever sleeve 73 to provide a reciprocating lever arrangement that is freely journaled for movement about central conduit 26. Accordingly, the forward portion of elongate lever sleeve 73 is shown in FIG. 3 and is referred to simply as journaling portion 74. Thus, both the composite lever 71 and the capstan 51, including ratchet wheel 53, are freely mounted about the central conduit 26; therefore, their movement is independent of the rotation of central conduit 26. Mounts 77 and 78 comprise pawl mounts and are fixed by screws or other means as at 79 to the respective lever and elongate lever sleeve 73. Compression springs 84 and 81 are secured between pawls 82 and 83 and their base mounts fixed to the elongate lever sleeve 73 and frame 11.

The orientation of the pawls 82 and 83 is such as to afford a clockwise movement of the capstan when the lever 71 is pulled upwardly by lever member 72, and yet precludes a reversal of the capstan, owing to the positionment of pawl 83 and its engagement with ratchet wheel 53. Cylinder 80 comprises part of a reciprocating jack structure 85 which will be described in detail hereinafter. Suffice it to say at this point that the cylinder 80 is provided with a piston rod 86 and that lever member 72 is engaged by being pinned to a cylinder extension 87. Accordingly, as the cylinder 80 is urged upwardly in the direction of arrow 88, this by an effectuation of the outward extension of piston rod 86 relative to the cylinder, then the lever 71 is pulled upwardly at its left end such that pawl 82 rotates the ratchet wheel 53 and the capstan portion 52 welded thereto, in a clockwise direction as shown by arrow 89.

The return or descent of the cylinder 80 in the manner hereinafter described will return the lever member 72 to its position shown in FIG. 1 so that the pawl 82 is now in position and engages the teeth of the ratchet wheel for a subsequent clockwise rotational displacement of such ratchet wheel, the latter carrying the capstan portion 52 with it.

The structure of FIGS. 1–4 is thus far described as follows. Pressured water is supplied a water supply hose 24 by a pump or other means; thus water under pressure appears at the conduit or hose 44 leading to the leg 43 of coupling tee 45. Water thus is disposed under pressure and is routed central conduit 26, being directed to the interior thereof by slots 34. The water thus is supplied the legs 31 and 32 of the central conduit of wheel line 20.

Figure 4:
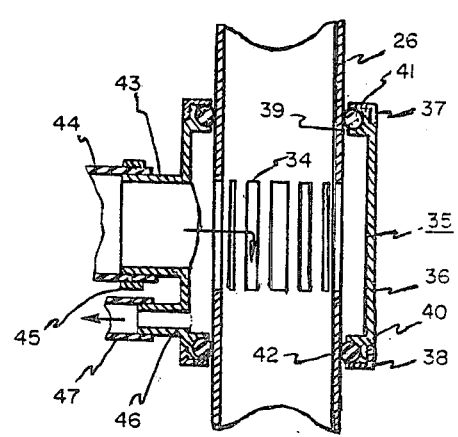
FIG. 4 is an enlarged vertical section taken along the line 4—4 in FIG. 2.

Pressured water is tapped by port 46 from the tee and is routed in the direction of the arrows shown in FIG. 4, back through conduit 47 leading to pressure regulator valve 48. The water is adjusted for purposes hereinafter set forth so that the water under pressure arrives via conduit 49 to valve 50. This provides for expansion and contraction of the cylinder means C, comprising the cylinder 80 and piston rod 86, so that an up and down reciprocating motion of lever 71, at its leftward extension of lever 72, is effective to sequentially rotationally displace in a clockwise direction the capstan structure 55 to the right side of FIG. 1.

It must be emphasized that, notwithstanding the fact that central conduit 26 may rotate, this in accordance with the rotation of the opposite lengths of the wheel line, still capstan 51 and the forward portion of lever sleeve 73 are freely journaled on such central conduit 26. Thus, successive rotational displacements of the capstan are operative solely to advance the capstan forwardly in a horizontal line, in the direction of arrow 60, along cable 55. This, hence, effects a pure translation only, in a forward longitudinal direction, of the drive structure 10 in FIGS. 1 and 2.

The structure of FIGS. 5, 6 and 6A, is exactly the same as that shown in FIGS. 1–4, with but limited exceptions, these exceptions consisting of the modification of tee 35 to tee 35A in FIG. 6 wherein there is no main pressure supply leg but rather merely a reduced leg 46A, corresponding to leg or port 46 in FIG. 4, which provides for pressure fluid to conduit 47A corresponding to conduit 47 in FIG. 4. Also, the enlarged slots 34 in FIG. 4 are not needed, and plural, bore-type reduced apertures 34A are provided.

Figure 2:
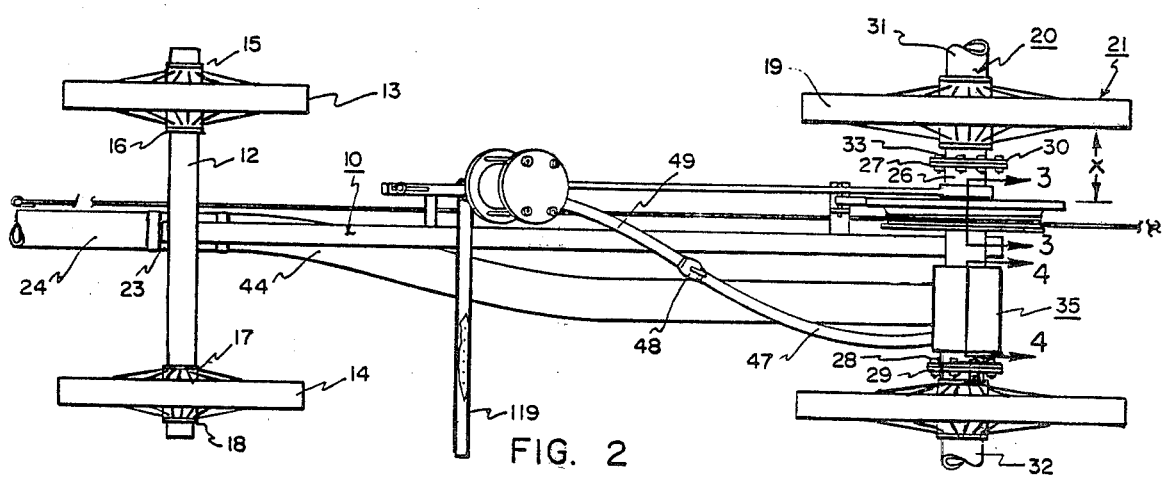
FIG. 2 is a plan view of the structure of FIG. 1.

A further modification is that, rather than having a capstan structure, a fixed ratchet wheel or spur gear 92 is provided and is welded at 93 or otherwise secured to central conduit 26A corresponding to conduit 26 in FIG. 2. Lever 71A, corresponding to lever 71 in FIG. 1, is operative in the same manner as before, with its pawls 82A and 83A, but this time engages the ratchet wheel 92 so as to apply torque to central conduit 26A. Conduit 47A leads to pressure regulator valve 48A, similar to valve 48 in FIG. 1, which valve is coupled to conduit 49A leading to valve 50 in FIG. 5.

Relative to tees 35 and 35A, their seals may be configured in the manner shown in FIG. 6A and can be identical in construction, save only for but a single leg or port being provided in the case of tee 35A.

In operation in FIG. 6, therefore, an up-and-down reciprocation of the end 71B of lever 71A in FIG. 5 produces a succession of rotational displacements of ratchet wheel or spur gear 92, and this in turn produces corresponding rotations of the central conduit 26A. Thus, the structure in FIGS. 5, 6, and 6A, represent a torque booster or torque assist structure and, where several units corresponding to the structure shown in FIG. 5 are mounted at spaced points along a wheel line as seen in FIG. 9, such torque boosters being designated as unit 94, then the elongate side-roll wheel line will be torqued at mutually spaced points. The torque booster structure 94 of FIG. 5 is therefore utilized in a series of points spaced longitudinally along the wheel line. The master unit or drive structure, however, will be provided at 10 as shown in FIG. 9, see FIG. 1.

The jacking structure including cylinder means C in FIG. 7 can be the same simply as that shown in the inventor's U.S. Pat. No. 3,980,098, fully incorporated herein.

The hoses or conduit 49 and 49A, the levers 71, 71A- of FIGS. 1 and 5, respectively, are indicated in FIG. 7. Since the structure as to the jacking means is the same for both of the units in FIGS. 1 and 5, single numbers will be employed for purposes of clarity. Accordingly, cylinder 80 is provided with piston rod 86 that is hollow and terminates inside hollow piston 99. The hollow forward or downward end of the piston rod 86 is secured to a conduit connector 100 that couples via conduit 101 to valve 102; the internal structure is shown as broken away in FIG. 7. Conduit 103' couples conduit 49, 49A as the case may be, to the valve 102. The valve closure 103 includes a stem 104 having a reaction end 105. The reaction end is pushed downwardly or lifted up, the latter being the case in FIG. 7, by a yoke actuator 106 pivoted by attachment means 107 to upstanding arm 108 leading upwardly from frame 11. The tail 109 of yoke 107 is pivoted at the a connector 110 that connects to actuator rod 111. The latter is threaded and is provided with stop nuts at 112 and at 113, these locations being mutually spaced from each other as shown. Finger abutments 113 and 114 serve as engagement portions for actuating the portion 105 operatively associated with valve 102.

Accordingly, with the cylinder C disposed at its lowermost position, the valve stem 104 is lifted upwardly so as to open the valve opening A', thus providing fluid flow from conduit 49 or 49A, as the case may be, upwardly in the direction of arrow D. Such pressured fluid supplies a force on top of the cylinder 80, as indicated by the arrow, and an opposite force upon the upper surface of the piston 99 as to advance the cylinder upwardly in a direction of arrow E. The cylinder continues upwardly until the cylinder arm 115, see also FIG. 1, advances upwardly to contact the stop nuts 113 and hence lift the actuator rod 11. When such happens then the yoke pivots about pivot attachments 107 in a clockwise direction so that now the actuator finger 113 comes down to lower the valve stem and particularly at reaction portion 105 thereof. This serves to reverse the flow through the valve so that the weight of the cylinder, or spring 115 connected between anchor 116 and frame anchor 117, will cause an exhaust fluid in the direction shown in FIG. 8, either through a valve opening or to a perforated drain pipe 119 connected to the valve at 120. Drain pipe 119 is indicated in FIG. 2, but may be supported by the frame in a general position beneath the wheel line and provided a flex-hose connection to the valve drain. Thus, and in any event, the drain water will not form in puddles but rather will be sprayed evenly over a strip of the field over which the unit travels. Thus, the condition of the structure shown in FIG. 7, for both of the units of FIGS. 1 and 5, illustrate an upward movement of the cylinder and hence an upward movement of the lever in FIG. 7 so as to either rotationally displace the capstan or the torquing gear, as the case may be. FIG. 8 refers to a descent of the lever once the valve condition of valve 102 has been altered, in the manner shown in FIG. 8, as occasioned by the engagement of piston arm 115 with stop nuts 113. The cylinder arm or toe may be simply welded or bolted to the cylinder so as to raise in accordance with the ascent of such cylinder.

Again, the structure of FIG. 7 and FIG. 8, and the operative conditions of such structure, are the same, for identical jacking structures are incorporated with the drive structure unit of FIG. 1 and the torque boosting unit of FIG. 5.

In referring to FIG. 9 it is seen that the wheel line comprises elongate lengths L1 and L2 having a series of support wheels 19. The side-roll wheel line in the aggregate shall be termed wheel line 21, see FIG. 2.

The drive structure or unit 10 may be disposed centrally of the line as seen in FIG. 9. Periodically spaced along the line will be the torque booster units or structure of FIG. 5, identified by the numeral 94.

The operation, which is most important, of the structure seen in FIG. 9 is as follows.

At the outset it is to be observed that it is most desirous for the line to travel in a straight condition, so as to avoid bending or even breaking portions of the line or structure associated therewith. Accordingly, each section of the line should keep in step such that the orientation of the line is essentially rectilinear and in a normal or 90 degree relationship with the direction of intended travel.

Stakes 58 and 59 are emplaced in the field such that a condition of tautness exist relative to cable 55. The master unit or drive structure 10 is coupled to hose 24 and the water pressure turned on. Water is coupled to the line through tee 35 so that all of the sprinklers S of the line are supplied with water pressure. Accordingly, the line and particularly the central portion thereof starts to advance forwardly in the direction of the arrows seen in FIG. 9. Additionally, since water is likewise coupled to all of the torque booster units 94 of FIG. 5, such units being spaced along the line as seen in FIG. 9, then the central conduit of the wheel line is torqued at spaced points so that progressive sections of the line likewise advance forwardly. It is noted that the structure as thus far defined and described provides torquing connection at mutually spaced points. This compensates for torsional lag where there solely is a torquing action at a central part only of the line.

Suppose at this juncture that through terrain conditions or for other reasons the drive structure 10 and the line associated therewith advances slightly ahead of the rest of the line. Or to put it another way, suppose the ends or even other portions of the line lag behind structure 10. In such event the inertia or resistance to torquing will build up to a degree that the jacking or cylinder structure of unit 10, at such torque resistance threshold, will not be effective to advance drive structure 10 forwardly any further. This in fact is exactly what is wanted. Thus, the stall out or arresting of the operation of the cylinder structure of FIG. 1 is controlled by the suitable, prior manual adjustment of pressure regulator valve 48. Accordingly, when the load becomes too great, the jacking structure appropriately stalls out, i.e. is not effective to further advance the central part of the line by virtue of capstan revolvement since the point of maximum powering thereof was previously reached. Hence, the capstan will cease to rotate as to unit 10. This, however, does not deter the torque booster units from operating and in fact, allows them to continue to torque the lines so that line portions proximate these booster units will catch up to the 90° or normal relationship desired. Indeed, these booster units will remotely "sense" the stoppage of the master or drive unit so that these will feel a decreasing load on their operation. This is unique and most important, namely, that there is an automatic torque-sensing throughout the line to keep the line straight. Should one unit lag behind, adjacent units will sense the increased load and will stall out, allowing the "behind" unit to sense the progressively reducing load and allow such unit with its line portion to "catch up". It is noted that all of this is done automatically, without the operator having any means whatever to run out to the line to adjust for nonlinear conditions along the line. The degree of permissible deflection along the line, however, can be adjusted by setting points of maximum torque at the pressure regulator valves 48 and 48A of the units 1 and 5. Cylinder operation of one unit resumes after stall-out once adjacent units have "caught-up".

To operate most effectively, the manufacturer will make sure that the transverse conduit portion 26, for example, is exactly in 90° transverse relationship relative to frame 11. Additionally, and to avoid torsional lag problems, the master unit to be made as close to the first wheel of itself or the wheel line, at 19 as possible. The distance X in FIG. 2 should be not more than 2 feet and preferably about 16–18 inches.

Again, where the pressure regulator valves are adjusted properly, then a forward or advance of the master unit beyond the general orientation of the line will so increase the load on the master or drive unit that the hydraulic structure associated with the capstan will stall out, namely, be inoperative, and hence temporarily cease advance of the capstan along its cable and thus the forward advance of the unit. Torque boosters downstream will sense the decreasing torquing load, as a result of the slowing down of the master unit, so as to allow these to effectively increase their operation and the torquing of the line so that their portion of the line respectively catch up. At this point the load on the capstan is reduced and the cylinder, set at its operating pressure by pressure regulator valve 48, will be operative to continue advancing drive structure forwardly.

Figure 10:
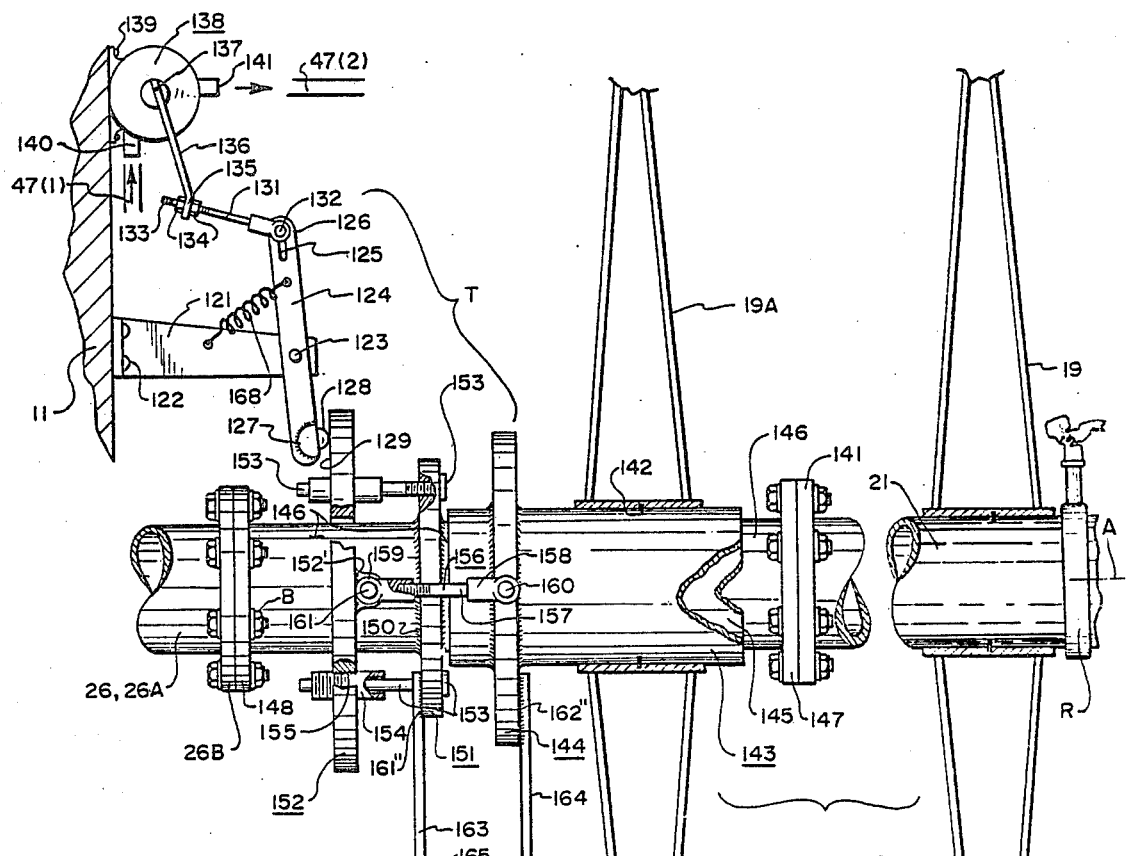
FIG. 10 is a view of additional structure which may be interposed in a wheel line for sensing excessive torque-resistance loads for operating valve means to alter the fluid flow to an operating cylinder of the unit of FIG. 1 or of FIG. 5.
Figure 11:
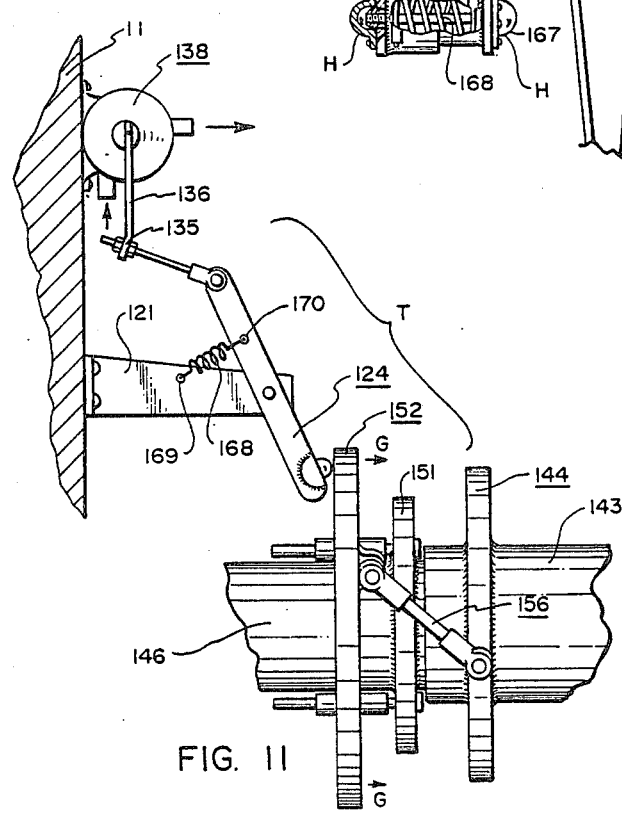
FIG. 11 is a view of the upper left hand portion of the structure of FIG. 10, illustrating in modification an orientation of parts so as to actuate a valve in the system.

In FIGS. 10 and 11 frame 11 is provided with bracket 121 secured thereto by attachments 122 and provided with upstanding pivot means 123. The pivot means pivots arm 124, provided with a slot 125 at end 126. Remaining end 127 has a ball bearing roller 128. The same, of course, may be replaced by a wheel or any other type of low friction structure designed to contact and remain in rolling engagement with surface 129 of ring 152.

A link 131 is pivotally retained by pin means 132 in slot 125 and has a threaded end 133 provided with attachment means 134 for securing the ear 135 of a valve control 136. Valve control 136 is rotatable about its axis 137 relative to its valve 138. Valve 138 is secured by attachments 139 to the frame and comprises an inlet valve for interposition in conduit 47 in FIG. 1 or for interposition in conduit 47A in FIG. 6, merely by way of example. For convenience, the ports 140 and 141 of the valve shall be referred to as being connected to lengths 47(1) and 47(2), comprising segments of the conduit 47 in FIG. 1.

In any event, the valve 38 will be disposed proximate the water supply, as hereinafter further explained, for the respective cylinders of the units of FIGS. 1 and 5. Transverse wheel-line conduit 26, with central axis A, of the structural unit of FIG. 1 or 26A, FIGS. 5, 6, includes an attachment flange 26B that can normally be coupled to flange 141 of irrigation wheel line 21, the latter being provided with a series of mutually spaced wheels 19 and associated sprinkler apparatus R. It will be understood that the torque-resistance-sensing structure T of FIGS. 10 and 11 may be either interposed between the central transverse conduit 26 and the wheel line as seen in FIGS. 10 and 11, may be incorporated into the transverse conduit structure relative to conduit 26, 26A of the units of FIGS. 1 and 5, or may simply comprise an end portion of the wheel line. In any event, and considering the structure as shown, a wheel 19A is pinned or keyed at 142 to sleeve, hub or collar 143 provided with an integral flange ring 144. The sleeve is disposed over a bushing 145 to provide for the rotation of the wheel 19A and its sleeve 143. Conduit 146 is a central, water transport conduit provided with attachment flanges 147 and 148, secured by bolt attachments B to the flanges 26B of transverse conduit 26 and to flange 141 of the wheel line. Welded to conduit 146 at 150 is a ring 151. Freely mounted on conduit 146 is a ring 152. Rings 151 and 152 include intercooperating pins 153 and sleeve receivers 154, the latter being threaded at 155 into ring 152 and the former into ring 151. Link 156 resembles a turnbuckle, having a central elongate member 157 threaded in opposite directions for threading into the link ends 158 and 159 that are pivotally attached to posts 160 and 161 of the rings 144 and 152 as seen. Post 161 upstands from boss 152' of ring 152. If desired, an additional link 156 can be positioned at a point directly beneath link 156 shown, on the opposite side of conduit 146, and be similarly connected to rings 152 and 144.

To rings 151 and 144 are welded, as at 161" and 162", a pair of arms 163 and 164. These arms are provided with telescoping, freely radially spaced cylindrical bosses 165 and 166 which are loosely, articulatively secured together by pin means 167 surrounding a torsion return-spring 168 connecting such arms at swivel bases H.

In operation, it will be seen that the pins 153, secured to ring 151, will move in and out of receivers 154; hence, the receivers with their slide pins 153 keep in alignment the ring 152 with the ring 151.

In operation, let it be assumed that the FIG. 10 structure illustrates the normal condition and that the unit of FIG. 5 to the wheel line central conduit is running over sod or very lightly ploughed field. The structure of FIG. 10 illustrates the now present condition wherein valve 138 is in, say, a half-flow condition.

Assume now that the wheels and particularly wheel 19A proximate the unit of FIG. 5, suddenly traverses an area that is deep ploughed or otherwise produces an unusually high resistance or load to the application torque to advance the unit forwardly. Thus, wheel 19A will tend to slow down or log until additional power is here supplied. Note that the master unit of FIG. 1 will still travel along its capstan cable to advance the line and indirectly supply torque and rotational movement through such line translation to the wheel line central conduit.

A sudden stop or tendency to so slow down, by wheel 19A, will produce a lag in rotation of ring 144 relative to ring 151 so that the condition shown in FIG. 11 now obtains. The linkage means 156, is now being disposed at an slight angle, tends to pull the ring 152 toward ring 144. This movement, in the direction of the arrows G in FIG. 11, causes arm 124 to reorient itself under the spring-bias of spring 168, anchored at 169 and 170, thereby producing a radial or eccentric-like displacement of boss 166 relative surrounding boss 165 and a reorientation in the valve control, i.e. arm 36 of valve 138. The valve is designed so that such new orientation of valve control 136 will increase water flow through the valve so as to supply a substantial increase in liquid volume and pressure relative to the torquing unit of FIG. 5 at its cylinder structure. Valve 48A, by way of example, may be set above this maximum threshold figure or, the operating conditions may be such that 48 and 48A may be deleted in lieu of valve 138. Optionally, the valve 138 may be interposed in the principal conduit 44 in FIG. 1, by way of example. Wherever it is situated, it operates to markedly increase fluid flow, so as to supply, through automatic sensing of increase torque load as in FIG. 11, increased fluid power to torque and thereby advance the wheel line portion to which the particular unit of FIG. 5, incorporating the structure of FIGS. 10 and 11, is coupled.

The torque sensing structure of FIGS. 10 and 11, thus senses angular or rotational displacement or mutual rotative disposition of a tubular member relative to a sleeve slidably disposed thereover, and likewise attached structure as shown in FIG. 10 for effecting a desired result by either markedly increasing torque application, or simply even stopping the unit. Thus, where the valve 138 is designed for shut off condition in FIG. 11, then such valve, with the structure of FIGS. 10 and 11 may be incorporated with conduit 26 of the master or translation-power unit of FIGS. 1 and 4. In such event, the master will be shut down or stopped as to its operation in the event of excessive field resistance as experienced by its wheel 19A. The valve 138, here, may be interpositioned at either of the following points, merely by way of example: conduits 24, 44, 47 and 49. As to the structure of FIG. 5, the valve can be interposed in conduits 47A, 49A, or even shunt valve 48A, by way of example. Wherever the valve 138 is used, in either unit (FIG. 1 or FIG. 5), the valve is operative to dramatically affect cylinder operation in response to extreme, field resistance conditions, when such conditions pass, then the normal FIG. 10 condition returns.

What is provided, therefore, is an irrigation system and torque booster and propulsion units therefor which are operative not only to perform their intended function of torque rotation and advancement but also mutually sense, through varying load fluctuations, the condition of the line at various points so that slight devications in line orientation are compensated for and the line moves in a straight manner down the field. Extreme field conditions are now addressed.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention. I claim:

1. An agricultural irrigation structure having a rotating member and power control means, and in combination therewith, a ground contacting wheel carried by said structure and having a central axis of revolvement, and means revolvable about said central axis, coupled to and between said rotating member and said wheel, and responsive to divergence of relative rotational movement between said rotating member and said wheel for automatically adjusting said control means.

2. In combination, a rotatable cylindrical member, a wheel freely journaled on said cylindrical member, a first member keyed to said wheel, a second member keyed to said cylindrical member, a third member keyed for rotation and also for proximate and remote positioning with respect to said second member, variable-orientation essentially-fixed-length link means articulatively coupled to and between said first and third members, variable control means, and means responsive to the variable position of said third member for automatically adjusting said control means.

3. In combination, a wheel, a revolvable member freely journaling said wheel and having a predetermined beginning rotative disposition relative to said wheel, a propelled ground-contacting unit provided with means for applying variable torque to said revolvable member and also control means for varying such torque, and linkage coupled between said control means and said wheel and revolvable member and responsive to circumferential displacement of said wheel relative to said revolvable member for tending to restore said rotative disposition of said revolvable member relative to said wheel to their beginning mutual relationship.

4. In an agricultural irrigation structure having a wheel-line provided with an extending rotating liquid-supplying conduit and means for rotating the conduit, a ground-engaging wheel operatively carried on and rotatably actuated by said conduit, sensing means between said wheel and said conduit for sensing off-alignment therebetween while said wheel is being advanced along the ground by rotative movement imparted thereto by said conduit, and said sensing means being adapted to automatically effect realignment of said wheel and said conduit.

5. In an agricultural irrigation structure as defined in claim 4, said sensing means having cross-connecting linkage between said wheel and said conduit.

6. In an agricultural irrigation structure as defined in claim 5, said means for rotating said conduit being liquid-driven by liquid being supplied to said conduit, valve means for controlling the operation of said liquid-driven means, and means operatively connecting said linkage with said valve means for operating said valve means to accommodate its flow control with alignment sensing of said sensing means.

7. In an agricultural irrigation structure as defined in claim 4, said means for rotating said conduit being fluid-actuated, and said sensing means being operatively connected to said fluid-actuated means for varying its actuation to accommodate ground-advancing movement of said wheel with rotation of said conduit.

8. In an agricultural irrigation structure as defined in claim 4, a wheel collar rotatably carrying said wheel on said conduit, said sensing means having linkage and a slide ring carried on said conduit, said slide ring being operatively connected by said linkage to said wheel collar, and said slide ring being adapted to move axially along said conduit in accordance with rotative off-alignment of said wheel collar with respect to said conduit during advancing movement of said wheel along the ground and thereby sense off-alignment between said wheel and said conduit.

9. In an agricultural irrigation structure as defined in claim 8, a second ring being secured on said conduit, guide means slidably aligning said slide ring with respect to said conduit member, said linkage being pivotally connected between said wheel collar and said slide ring, flexible means connected between said wheel collar and said second ring for translating rotative movement from said conduit to said wheel collar to advance said wheel along the ground.

10. In an agricultural irrigation structure having a wheel-line provided with an extending-rotating liquid-supplying conduit and drive means for rotating the conduit, a ground-engaging conduit-supporting wheel, means flexibly connecting said conduit to said wheel for effecting rotative advancing movement of said wheel along the ground, angularly displaceable sensing means between said wheel and said conduit for sensing angular deviation therebetween, and means connected to said sensing means for accommodating rotation of said conduit to angular displacement between said conduit and said wheel.

11. In an agricultural irrigation structure as defined in claim 10, said last-mentioned means has means for relatively increasing the rate of advancing movement of said wheel when said sensing means indicates a lag in movement of said wheel with respect to movement of said conduit.

12. In an agricultural irrigation structure as defined in claim 10, said sensing means comprising: a fixed ring secured on said conduit, a slidably displaceable slide ring on said conduit in an adjacent relation with respect to said fixed ring, guide means between said fixed ring and said slide ring for maintaining said slide ring in axial slideable alignment with respect to said conduit, and a wheel ring having linkage pivotally connected to said slide ring for moving said slide ring axially with respect to said conduit in accordance with angular displacement of rotative movement between said conduit and said wheel.

13. In an agricultural irrigation structure as defined in claim 12, said drive means for rotating said conduit member being fluid-actuated and having a control valve therefor, a level system connected to said valve for controlling flow of actuating fluid to said drive means, and said lever system having camming means engaging said slide ring for translating axial sliding movement thereof into valve controlling actuation of said lever system.

14. In an agricultural irrigation structure having a wheel-line provided with an extending-rotating liquid-supplying conduit and means for rotating it, a ground-engaging wheel carried on a common axis of revolvement by said rotating conduit, a collar rotatably carrying said wheel with respect to said conduit member for sensinng off-alignment between said wheel and said conduit while said wheel is being advanced along the ground by rotative movemen imparted thereto by said conduit for automatically accommodating the drive of said conduit to effect a desired movement of said wheel. conduit member, means coupling said conduit member with said collar for driving said wheel along the ground, said coupling means having cross-connecting linkage between said collar and said conduit member for sensing off-alignment between said wheel and said conduit while said wheel is being advanced along the ground by rotative movement imparted thereto by said conduit for automatically accommodating the drive of said conduit to effect a desired movement of said wheel.

* * * * *

UNITED STATES PATENT AND TRADEMARK OFFICE
CERTIFICATE OF CORRECTION

PATENT NO. : 4,192,340
DATED : March 11, 1980
INVENTOR(S) : Burr Courtright

It is certified that error appears in the above—identified patent and that said Letters Patent is hereby corrected as shown below:

Claim 11, column 12, line 38, delete "has" and insert --having--.

Claim 13, column 12, line 58, delete "level" and insert --lever--.

Claim 14, column 13, lines 1 thru 7, beginning with "conduit member" at line 1, delete all language, lines 2,3,4,5 and 6. Delete "member" at column 13, line 7 (both occurrences) and column 14, line 2.

Signed and Sealed this

Second Day of December 1980

[SEAL]

Attest:

SIDNEY A. DIAMOND

Attesting Officer

Commissioner of Patents and Trademarks